United States Patent [19]
Harris

[11] Patent Number: 5,422,753
[45] Date of Patent: * Jun. 6, 1995

[54] BINARY DIFFRACTION OPTICAL ELEMENT FOR CONTROLLING SCANNING BEAM INTENSITY IN A RASTER OUTPUT SCANNING (ROS) OPTICAL SYSTEM

[75] Inventor: Ellis D. Harris, Claremont, Calif.

[73] Assignee: Xerox Corporation, Stamford, Conn.

[*] Notice: The portion of the term of this patent subsequent to May 24, 2011 has been disclaimed.

[21] Appl. No.: 172,319

[22] Filed: Dec. 23, 1993

[51] Int. Cl.⁶ .............................................. G02B 26/08
[52] U.S. Cl. ................................... 359/216; 359/569; 359/217
[58] Field of Search ............................. 359/216–219, 359/17–18, 566–569, 565

[56] References Cited

U.S. PATENT DOCUMENTS

| | | | |
|---|---|---|---|
| 4,895,790 | 1/1990 | Swanson et al. | 430/321 |
| 5,073,007 | 12/1991 | Kedmi et al. | 359/565 |
| 5,144,484 | 9/1992 | Southwell | 359/565 |
| 5,208,701 | 5/1993 | Maeda | 359/569 |
| 5,227,915 | 7/1993 | Grossinger et al. | 359/565 |
| 5,229,883 | 7/1993 | Jackson et al. | 359/569 |
| 5,255,112 | 10/1993 | Hori et al. | 359/216 |
| 5,257,133 | 10/1993 | Chen | 359/569 |
| 5,258,862 | 11/1993 | Harris | 359/18 |
| 5,291,319 | 3/1994 | Harris | 359/18 |
| 5,309,272 | 5/1994 | Harris | 359/18 |
| 5,315,427 | 5/1994 | Rauch et al. | 359/216 |

OTHER PUBLICATIONS

W. Veldkamp & T. McHugh, "Binary Optics", *Scientific American*, vol. 266, No. 5, May 1992, pp. 92–97.

G. J. Swanson, "Binary Optics Technology: The Theory and Design of Multi-Level Diffractive Optical Elements", Lincoln Laboratory, Massachusetts Institute of Technology, *Technical Report* 854, 14 Aug. 1989.

Primary Examiner—Loha Ben
Assistant Examiner—Steve Kong
Attorney, Agent, or Firm—William Propp

[57] ABSTRACT

A binary diffractive optical element provides uniform intensity for the scanning beam of a raster output scanning (ROS) optical system by diffracting the excess intensity of the beam.

4 Claims, 4 Drawing Sheets

BINARY DIFFRACTION OPTICAL ELEMENT FOR CONTROLLING SCANNING BEAM INTENSITY IN A RASTER OUTPUT SCANNING (ROS) OPTICAL SYSTEM

BACKGROUND OF THE INVENTION

This invention relates to a raster output scanning (ROS) optical system, and, more particularly, to a binary diffractive optical element for controlling scanning beam intensity by providing uniform intensity in a raster output scanning (ROS) optical system.

Prior art printers and copiers utilizing a raster output scanning (ROS) optical system typically also utilize a rotating polygon having flat reflective surfaces, or facets, in parallel with the axis of rotation of the polygon. A beam, (or beams if a multiple diode is used) is emitted from a light source such as a helium-neon laser or a diode laser. The light is modulated according to an input electrical signal, directed through pre-polygon conditioning optics, and directed onto the facet surfaces of the rotating polygon. The beams are reflected from the facet surfaces through a post-polygon conditioning lens system and across the full process width of a photoreceptor medium.

The scanning beam reflected from the facet surfaces of the rotating polygon may have a decrease in intensity at both ends of the scan across the photoreceptor medium (a condition conventionally referred to as "frown").

Control over the light exposure level at the photoreceptor is required in all laser printers and copiers if acceptable prints and copies are to be produced. Indeed, beam intensity is critical if the proper exposure level for the particular photoreceptor used is to be assured. Variations in intensity across the scan line and from scan line to scan line, and in the laser output power, and in the transmittance, reflectance, and throughput efficiency of the various optical components must be compensated for. For example, a decrease in a spot intensity will result in a spot size decrease and will have a negative impact upon print quality especially in color systems.

And today, exposure control takes on added importance and criticality with the drive toward increased print resolution, half-toning, single-pass highlight color, and other developments where an intensity variation of no more than +/− 1% is desired.

Where gas lasers, such as a helium-neon laser, are used as the scanning beam source, light intensity is not directly variable at the source. In the past, if intensity control were to be provided, the drive power to the modulator was typically controlled. This allowed the diffraction efficiency of the modulator to be adjusted which, in turn, controlled the intensity of the scanning beam and provided the exposure levels desired. Today, however, the demand is for uniform exposure across the photoreceptor.

In many applications exposure control through adjustment of the modulator drive power is not a cost effective option.

Other possible sources of non-uniform intensity in the output scan are charge and development variations within a xerographic printing system; non-uniformities in polygon facet reflectivity, laser power degradation, loss of modulator efficiency and the like. Various techniques are known in the art for accomplishing some degree of compensation for these writing beam intensity variations. One technique incorporates the laser into a feed-back loop and then electronically controls the excitation level. Another technique describes a system for combining video image signals with beam intensity signals to provide an input to a modulator port which then regulates beam intensity. Still another technique is an intensity control device for a laser in a laser beam printer. The intensity control device stores a first representation of a present light intensity of the laser during its nonscanning mode and further stores a second representation of a user selected image density for a hard copy.

What is needed is a simple, inexpensive optical means for providing uniform intensity of a scanning beam along the scan line of a photoreceptor medium.

The propagation of a light beam can be changed by three basic means: reflection by a mirror, refraction by a lens and diffraction by a grating. Optical systems traditionally rely on reflection and refraction to achieve the desired optical transformation. Optical design, based on mirror and lens elements, is a well-established and refined process. Until recently, the problems with diffraction and fabricating high efficiency diffractive elements have made diffractive elements unfeasible components of optical systems.

The diffractive process does not simply redirect a light beam. Diffraction, unlike refraction and reflection, splits a light beam into many beams—each of which is redirected at a different angle or order. The percentage of the incident light redirected by the desired angle into some given diffraction order is referred to as the diffraction efficiency for that order. The diffraction efficiency of a diffractive element is determined by the element's surface profile.

Theoretically, on-axis diffractive phase elements consisting of a grating having a given period can achieve 100 percent diffraction efficiency. To achieve this efficiency, however, a continuous phase profile within any given period is necessary. The theoretical diffraction efficiency of this surface profile is also relatively sensitive to a change in wavelength. By contrast, refractive elements are relatively wavelength insensitive. The technology for producing high quality, high efficiency, continuous phase profiles of the diffraction does not presently exist.

A compromise that results in a relatively high diffraction efficiency and ease of fabrication is a multi-level phase grating. The larger the number of discrete phase levels, the better the approximation of the continuous phase function. The multi-level phase surface profiles of the grating can be fabricated using standard semiconductor integrated circuit fabrication techniques.

As disclosed in *Binary Optics Technology: The Theory and Design of Multi-level Diffractive Optical Elements* by G. J. Swanson of the Lincoln Laboratory at the Massachusetts Institute of Technology, (Technical Report 854, 14 Aug. 1989), herewithin incorporated by reference, and the resulting U.S. Pat. No. 4,895,790, a fabrication process starts with a mathematical phase description of a diffractive phase profile and results in a fabricated multi-level diffractive surface. The first step is to take the mathematical phase expression and generate from it a set of masks that contain the phase profile information. The second step is to transfer the phase profile information from the masks into the surface of the element specified by the lens design.

The first step involved in fabricating the multi-level element is to mathematically describe the ideal diffractive phase profile that is to be approximated in a multi-level fashion. The next step in the fabrication process is to create a set of lithographic masks which are produced by standard pattern generators used in the integrated circuit industry.

A substrate of the desired material, such as Ge, ZnSe, Si, GaAs, and $SiO_2$, is coated with a thin layer of photoresist. A first lithographic mask is then placed in intimate contact with the substrate and illuminated from above with an ultraviolet exposure lamp. Alternately, pattern generators, either optical or electron beam, can expose the thin layer of photoresist. The photoresist is developed, washing away the exposed resist and leaving the binary grating pattern in the remaining photoresist. This photoresist will act as an etch stop.

The most reliable and accurate way to etch many optical materials is to use reactive ion etching. The process of reactive ion etching anisotropically etches material at very repeatable rates. The desired etch depth can be obtained very accurately. The anisotropic nature of the process assures a vertical etch, resulting in a true binary surface relief profile. Once the substrate has been reactively ion etched to the desired depth, the remaining photoresist is stripped away, leaving a binary surface relief phase grating.

The process may be repeated using a lithographic mask having half the period of the first mask. The binary phase element is recoated with photoresist and exposed using the second lithographic mask which has half the period of the first mask. After developing and washing away the exposed photoresist, the substrate is reactively ion etched to a depth half that of the first etch. Removal of the remaining photoresist results in a 4 level approximation to the desired profile. The process may be repeated a third and fourth time with lithographic masks having periods of one-quarter and one-eighth that of the first mask, and etching the substrates to depths of one-quarter and one-eighth that of the first etch. The successive etches result in elements having 8 and 16 phase levels. More masks than four might be used, however, fabrication errors tend to predominate as more masks are used.

This process produces a multilevel surface relief grating structure in the substrate. The result is a discrete, computer-generated structure approximating the original idealized diffractive surface. For each additional mask used in the fabrication process, the number of discrete phase levels is doubled, hence the name "binary" optical element or, more precisely, a binary diffractive optical element.

After only four processing iterations, a 16 phase level approximation to the continuous case can be obtained. The process can be carried out in parallel, producing many elements simultaneously, in a cost-effective manner.

A 16 phase level structure achieves 99 percent diffraction efficiency. The residual 1 percent of the light is diffracted into higher orders and manifests itself as scatter. In many optical systems, this is a tolerable amount of scatter. The fabrication of the 16 phase level structure is relatively efficient due to the fact that only four processing iterations are required to produce the element.

After the first etching step, the second and subsequent lithographic masks have to be accurately aligned to the existing pattern on the substrate. Alignment is accomplished using another tool standard to the integrated circuit industry, a mask aligner.

As noted, the photoresist on the substrate can be exposed with an electron-beam pattern generator. The e-beam direct-write process eliminates masks and their corresponding alignment and exposure problems. Binary optics have also been reproduced using epoxy casting, solgel casting, embossing, injection molding and holographic reproduction.

Binary optical elements have a number of advantages over conventional optics. Because they are computer-generated, these elements can perform more generalized wavefront shaping than conventional lenses or mirrors. Elements need only be mathematically defined: no reference surface is necessary. Therefore, wildly asymmetric binary optics are able to correct aberrations in complex optical systems, and elements can be made wavelength-sensitive for special laser systems.

The diffractive optical elements are generally thinner, lighter and can correct for many types of aberrations and distortions. It is possible to approximate a continuous phase profile with a stepwise profile of discrete phase levels.

It is an object of this invention to provide a simple, inexpensive optical means for providing uniform intensity of a scanning beam along the scan line of a photoreceptor medium.

It is an object of this invention to provide a binary diffractive optical element for controlling scanning beam intensity in a raster output scanning (ROS) optical system.

SUMMARY OF THE INVENTION

In accordance with the present invention, a binary diffractive optical element provides uniform intensity for the scanning beam of a raster output scanning (ROS) optical system by diffracting the excess intensity of the beam.

Other objects and attainments together with a fuller understanding of the invention will become apparent and appreciated by referring to the following description and claims taken in conjunction with the accompanying drawings.

DESCRIPTION OF THE PREFERRED EMBODIMENT

Figure 1:
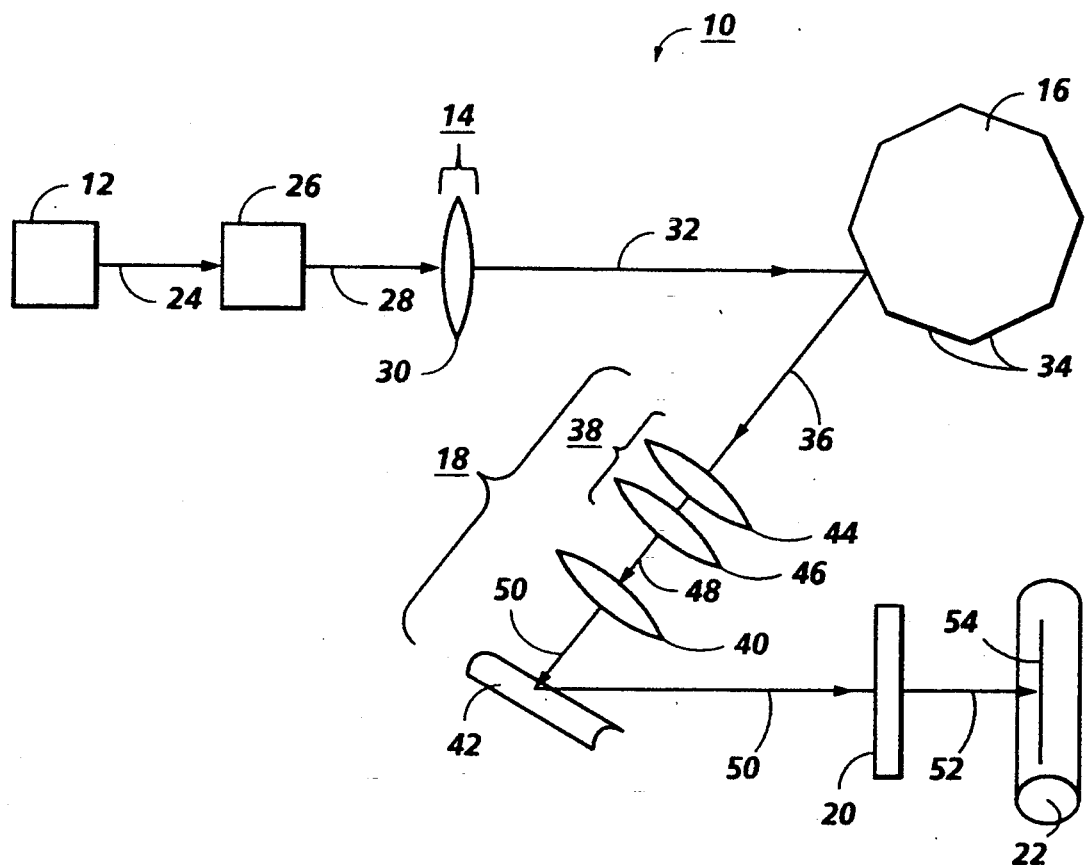
FIG. 1 is a schematic illustration of the top view of a raster output scanning (ROS) optical system with a binary diffractive optical element for controlling scanning beam intensity formed according to the present invention.

Reference is now made to FIG. 1, wherein there is disclosed a raster output scanning (ROS optical system 10 consisting of a light source 12, a pre-polygon mirror optical section 14, a multi-faceted rotating polygon mirror 16, a post-polygon mirror optical section 18 and a binary diffractive optical element 20 for controlling scanning beam intensity of the scan line along the photosensitive medium 22.

The light source 12, typically a laser with a collimator, emits a collimated light beam 24 of a single wavelength. The collimated light beam 24 is modulated by the modulator 26 producing a modulated light beam 28. The modulator 26 receives pixel information and modulates the beam in accordance with the pixel information.

The pre-polygon mirror optical section 14 is usually a cross-scan cylindrical lens 30. The collimated light beam 28 passes through a cross-scan cylindrical lens 30. The lens 30 may be cylindrical in the cross-scan plane and plano in the scan plane. Thus, the lens converges the cross-scan portion of the beam 32 focusing it on a facet 34 of the rotating polygon mirror 16 but allows the scan portion of the beam 32 to remain collimated when it strikes the facet 34.

The rotating polygon mirror 16 has a plurality of reflective facets 34. The facets 34 of the rotating polygon mirror 16 reflect the light beam 32 and also cause the reflected light 36 to revolve about an axis near the reflection point of the facet 34 of the rotating polygon mirror 16.

The post-polygon mirror optical section 18 usually consists of a f-theta scan lens 38, a cross-scan cylindrical lens 40 and a wobble correction mirror 42. The reflected beam 36 from the facet 34 is still collimated in the scan plane and is now diverging in the cross-scan plane. After reflection from the facet, the beam 36 then passes through a f-theta scan lens 38 consisting of a negative plano-spherical lens 44 and a positive plano-spherical lens 46. This f-theta scan lens configuration has sufficient barrel distortion to produce a linear scan beam 48 which then passes through a cross-scan cylindrical lens 40.

The lens 40 may be cylindrical in the cross-scan plane and plano in the scan plane. The cross-scan cylindrical lens will flatten the cross-scan field curvature of the beam from the f-theta lens while the f-theta scan lens, together with the cross-scan cylinder lens, produces a linear, flat-field scanning beam 50. The f-theta lens should be designed with the cross-scan cylindrical lens because the cross-scan cylindrical lens may contribute a small, but non-negligible, amount of distortion, especially at large scan angles.

After the cross-scan cylindrical lens 38, the scanning beam 50 is then reflected off a cylindrical wobble correction mirror 42 and through the binary diffractive optical element 20 which produces an uniform intensity scanning beam 52 along a scan line 54 on the photosensitive medium 22. The scan beam can, in the alternative, scan a document at the input end of an imaging system as a raster input scanner or can be used to impinge upon a photographic film or a photosensitive medium 22, such as a xerographic drum (photoreceptor), at the output of the imaging system.

The binary diffractive optical element 20 for controlling scanning beam intensity is in the optical path of the scanning beam between the post-polygon mirror optical section 18 and the scan line 54 on the photoreceptor medium 22.

Figure 2:
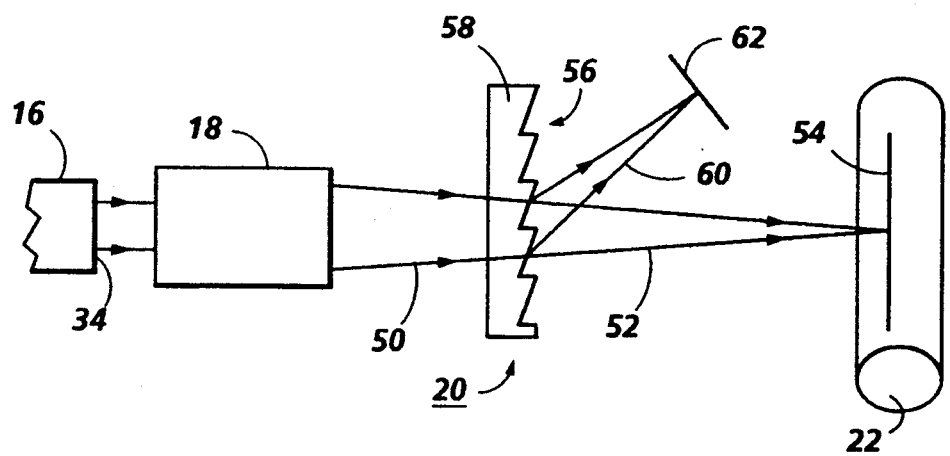
FIGS. 2 and 2a are schematic illustrations of the cross-section side view of the binary diffractive optical elements for controlling scanning beam intensity of FIG. 1 according to the present invention.
Figure 2A:
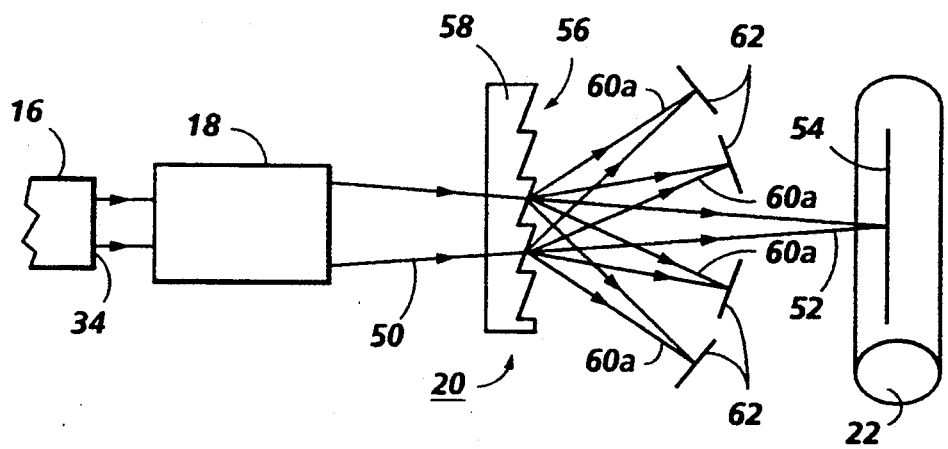

The binary diffractive optical element 20, as shown in FIGS. 2 and 2a, has a surface relief phase grating structure 56 on a substrate 58. The surface relief phase grating structure 56 diffracts light into the cross-scan plane. The scanning beam 50 is incident upon the binary diffractive optical element 20 in the scan plane. The surface relief phase grating structure 56 acts as a diffraction grating to diffract a portion of the scanning beam into a first order diffraction pattern in FIG. 2 or into a number of diffraction orders as shown in FIG. 2a. The remaining portion of the incident scanning beam 50 is transmitted through the binary diffractive optical element into an undiffracted zero order, uniform intensity scanning beam 52. The first order diffraction beam 60 in FIG. 2 and first order diffraction beams 60a in FIG. 2a will usually be diffracted into a stop 62 in the cross-scan plane while the uniform intensity scanning beam 52 in the scan plane will scan along a scan line 54 on the photosensitive medium 22.

Figure 3:
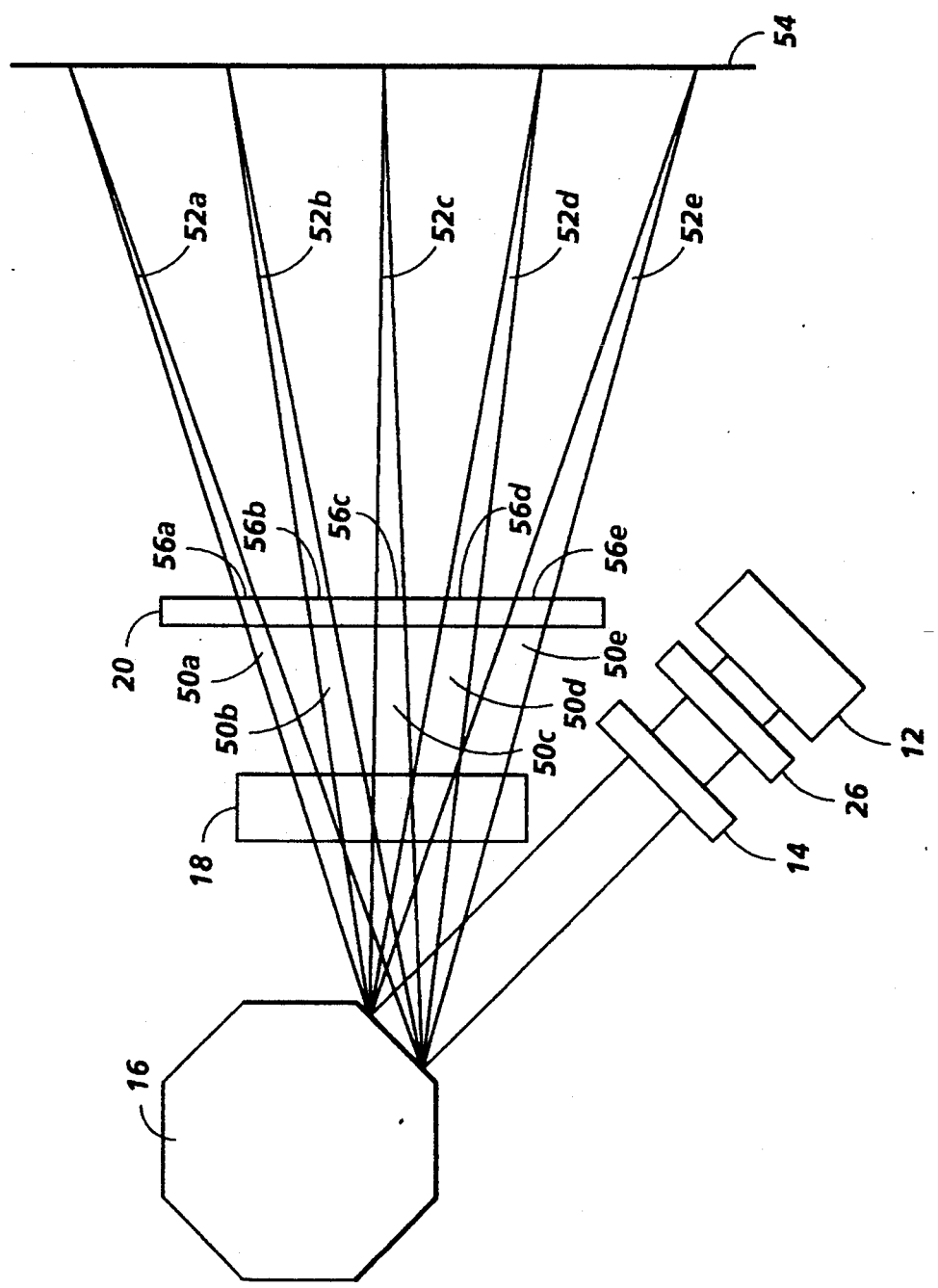
FIG. 3 is a schematic illustration of the top view of the binary diffractive optical element for controlling scanning beam intensity of FIG. 1 according to the present invention.

As shown in FIG. 3, the surface relief phase grating structure 56 varies across the scan plane of the binary diffractive optical element 20. The incident scanning beam 50 is shown in a number of scan positions divided into infinitesimal sections of equal width 50a, 50b, 50c, 50d and 50e across the scan line. In the absence of compensation, the scanning beam 50 may have non-uniform intensities in the scanning positions across the scan line, each scanning position having a width 50a, 50b, 50c, 50d and 50e will have a different intensity. Thus, in FIG. 4, the non-uniform intensity beam 64 has less intensity in the scan positions at the ends of the scan line 66 and 68 and a higher intensity 70 in the scan positions in the middle of the scan line (hence the descriptive name of a "frown"). Accordingly, returning to FIG. 3, the intensity will increase from its minimum in beam scanning position 50a to scanning position 50b to the maximum intensity at scanning position 50c, then decreasing to scanning position 50d and decreasing to its minimum at scanning position 50e.

The surface relief phase grating structure 56 of the binary diffractive optical element 20 is divided into infinitesimal sections of equal width 56a, 56b, 56c, 56d and 56e, corresponding to the differing positions of the scanning beam 50. Each section of the surface relief phase grating of the binary diffractive optical element will have a different structure to provide a different diffraction efficiency.

The minimum diffraction (attenuation of beam 50) by the surface relief phase grating structure 56 is along the end, section 56a, of the binary diffractive optical element 20, the diffraction increases through section 56b to a maximum at the center section 56c of the binary diffractive optical element 20 and then decreases through section 56d to the minimum diffraction at the opposing end, section 56e of the binary diffractive optical element 20. The binary diffractive optical element provides a uniform intensity at the lowest common intensity level of the non-uniform intensity scanning beam.

The resultant scanning beam 52 from the binary diffractive optical element 20 is divided at a number of scanning positions into infinitesimal sections of equal width and equal intensity 52a, 52b, 52c, 52d and 52e across the scan line 54, corresponding to the sections of scanning positions of differing intensity of the scanning beam 50 and the sections of different diffraction efficiency of the surface relief phase grating structure 56.

The positions of the scanning beam with the minimum intensity will be minimally diffracted by the surface relief phase grating structure of the binary diffractive optical element while positions of the scanning beam with the maximum intensity will be maximally diffracted by the surface relief phase grating structure of the binary diffractive optical element. The sections of the surface relief phase grating structures are scaled to the intensity level of the scanning beam.

Figure 4:
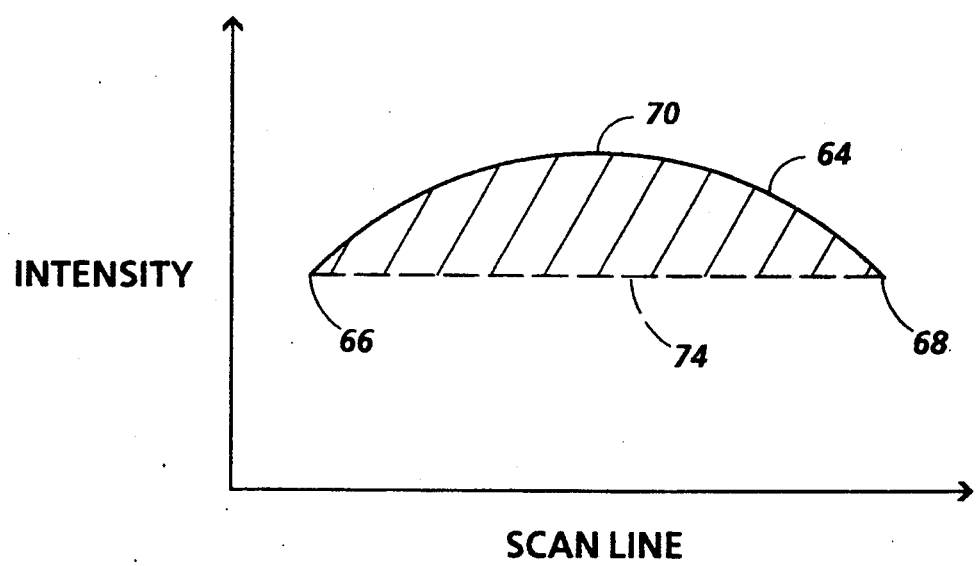
FIG. 4 is a schematic illustration of the side view of a non-uniform intensity beam across the scan line (a "frown") and the uniform intensity beam corrected by the binary diffractive optical element of FIGS. 2 and 2a according to the present invention.

As shown in FIG. 4, this matching of intensity level to surface relief phase grating structures provides a uniform lower intensity 74, equal to the intensity at the ends of the scan line 66 and 68. This reduced intensity occurs, as shown in FIGS. 2 and 3, by the binary diffractive optical element diffracting a portion of the scanning beam 50, and thus a portion of the scanning beams' intensity away from the scan line 52.

Alternate optical elements of the light source 12, the pre-polygon mirror optical section 14, the multi-faceted rotating polygon mirror 16, the post-polygon mirror optical section 18 of the raster output scanning (ROS) optical system 10 are known to those of ordinary skill in the art. The binary diffractive optical element may also incorporate certain lens functions and aberration correction.

The substrate of the binary diffractive optical element can be formed from glass, gallium arsenide, zinc selenide, germanium or quartz, for example.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. In a raster output scanning (ROS) optical system of a light source for emitting a light beam, optical means for focusing said light beam upon facets of a rotating polygon mirror, said facets scanning said light beam through focusing optical means along a scan line of a photosensitive medium, the improvement comprising
    a binary diffractive optical element between said focusing optical means and said photosensitive medium, said binary diffractive optical element having a surface relief phase grating structure upon an optical substrate for diffracting a portion of the intensity of said scanning light beam to produce a uniform intensity for said scanning light beam over its region of scan.

2. In a raster output scanning (ROS) optical system of claim 1 wherein said uniform intensity is the lowest intensity to said scanning light beam over its region of scan.

3. A binary diffractive optical element for producing a uniform intensity to a scanning beam in a raster output scanning (ROS) optical system comprising
    a surface relief phase grating structure upon an optical substrate, said surface relief phase grating structure diffracting a portion of the intensity of an incident scanning light beam wherein the remaining non-diffracted portion of said scanning light beam has a uniform intensity over its scan.

4. The binary diffractive optical element for producing a uniform intensity to a scanning beam in a raster output scanning (ROS) optical system of claim 3 wherein said uniform intensity is the lowest intensity to said incident scanning light beam over its region of scan.

* * * * *